United States Patent [19]
Linkbom

[11] 3,796,455
[45] Mar. 12, 1974

[54] AIR FLOW ACTUATED OVERHEAD PICKUP DEVICE FOR LIMP SHEET MATERIALS

[75] Inventor: Torsten H. Linkbom, Brookfield, Conn.

[73] Assignee: Unimation, Inc., Bethel, Conn.

[22] Filed: Sept. 5, 1972

[21] Appl. No.: 286,286

[52] U.S. Cl. .............................. 294/64 B, 271/97
[51] Int. Cl. ............................................. B66c 1/02
[58] Field of Search ............. 294/64 R, 64 A, 64 B; 269/21; 226/95, 97; 271/26, 27, 90, 98, 107, 108; 214/1 BS, 1 BE, 1.4, 8.5 D

[56] References Cited
UNITED STATES PATENTS

| 3,319,856 | 5/1967 | Stanley | 294/64 R X |
|---|---|---|---|
| 3,338,615 | 8/1967 | Fogg | 294/64 R |
| 1,930,778 | 10/1933 | Skidelsky | 294/64 R X |
| 2,956,769 | 10/1960 | Sigler | 294/64 R X |

Primary Examiner—Evon C. Blunk
Assistant Examiner—James L. Rowland
Attorney, Agent, or Firm—Mason, Kolehmainen, Rathburn & Wyss

[57] ABSTRACT

An air flow actuated overhead pickup device for discrete pieces of limp sheet material comprises a perforated support member for contact with the upper surface of the pieces of material to be picked up, said support member being dimensioned to define an outer marginal edge portion extending outwardly of the peripheral outer edge of the piece of sheet material being handled; means defining a plurality of inwardly convergent, high velocity, air flow channels extending from segments of said outer edge portion inwardly toward a common plenum chamber centrally positioned above the support member, said air flow channels including an increasing flow cross section toward the inner ends adjacent the plenum chamber thereby reducing the air flow velocity below that adjacent the outer edge portion; and fan means connected to the plenum chamber for maintaining a high velocity air flow inwardly through the channels, said fan means having an operating characteristic of essentially constant pressure over a broad volume range.

15 Claims, 5 Drawing Figures

PATENTED MAR 12 1974　　　　3,796,455

AIR FLOW ACTUATED OVERHEAD PICKUP DEVICE FOR LIMP SHEET MATERIALS

The present invention is directed towards an air flow actuated, overhead pickup device for use in lifting discrete pieces of limp sheet material. The pickup device is suitable for mounting on a programmable manipulator arm of the type shown and described in U.S. Pat. No. 3,661,051, dated May 9, 1972 or U.S. Pat. No. 3,306,442 dated Feb. 28, 1967, and may also be used with other types of support means and in connection with an assembly line, work table etc. to pick up pieces or patterns of limp sheet material and position or place the same at a selected location as desired.

The pickup device of the present invention is especially well adapted for handling limp (essentially nonelastic) sheet materials including woven fabrics, polyvinyl chloride films, nitryl rubber sheet material, uncured rubber sheets and is also useful in connection with relatively stiff (elastic) materials such as acryllics, plywood, etc.

Vacuum cup devices have been used for picking up a wide variety of different types of sheet materials but most of these devices depend upon good peripheral sealing around the edge of the suction cup in order to effect good pickup and most operate with a relatively high pressure differential. In picking up sheet material of a limp (nonelastic) nature, vacuum suction cups have not been effective because in many instances wherein the material may be irregular in shape and extend past or beyond the edges of the suction cup; the weight of the material causes it to droop downwardly in an amount depending upon the elasticity thereof and as it droops downwardly around the edges, the radius of the drooping curve decreases until the material peels away from the vacuum cup under its own weight and falls away regardless of the amount of suction pressure available at the vacuum cup. With relatively stiff or elastic materials the problem is not as acute as stiff materials do not bend as readily and hence the tendency to droop away around the edges and peel away from the vacuum cup is considerably less. In many instances vacuum cup devices are not effective in picking up porous or woven fabrics of a limp nature because of the air flow through the material itself which inhibits sealing around the periphery of the cup and reduces the amount of vacuum pressures available from a vacuum source. Materials such as uncured rubber which is relatively limp and, in which, viscous flow occurs within the material are difficult to handle with vacuum cups and are susceptible towards peeling or pulling away from the vacuum cup. The greater the density of the material and the lesser the elasticity or greater the limpness thereof, the more difficult it is to pick up sheet material with a vacuum cup pickup and still retain the material in a reasonably flat condition as is sometimes required in a particular operation.

The present invention operates on a flow principle rather than pressure alone and does not require sealing around the peripheral edges of the limp material in order to effect a pickup.

It is an object of the present invention to provide a new and improved overhead pickup device for discrete pieces of limp sheet material utilizing air flow forces developed in a high velocity air flow for picking up and holding the sheet material in a relatively flat condition.

Another object of the invention is to provide a new and improved overhead pickup device of the character described which is especially well adapted to handle extremely limp or nonelastic sheet material and pieces thereof having irregular shapes or patterns.

Another object of the present invention is to provide a new and improved overhead pickup device of the character described which does not require tight sealing around the edges of the material pieces being picked up.

Another object of the present invention is to provide a new and improved overhead pickup device which is useful in picking up sheet material of a nonuniform thickness and density for example, material such as tire treads and the like.

Another object of the invention is to provide a new and improved overhead pickup device utilizing air flow velocity forces for the pickup of limp sheet material of a porous nature.

Another object of the present invention is to provide a new and improved overhead pickup device which does not require a positive displacement, high vacuum pump for the operation thereof but instead may utilize a relatively low pressure, high volume fan for creating high velocity air flow to effect pickup of the material.

The foregoing and other objects and advantages are accomplished in one embodiment of the present invention comprising an overhead pickup device for discrete pieces of limp sheet material having a perforate material support member for contacting the upper surface of the piece of material to be picked up. The support member is generally flat and is dimensioned to define an outer marginal edge portion extending outwardly of the peripheral edge of the piece of material that is being handled. Means is provided defining a plurality of inwardly convergent flow channels expanding in transverse flow cross section from a minimum adjacent the outer edge of the material to a maximum adjacent a common plenum chamber centrally positioned above the support member. The increasing flow cross section of the channels reduces the velocity of air flow substantially below the maximum velocity achieved around the outer periphery of the sheet material. A high volume, low pressure fan means is connected to the plenum chamber for moving the air through the flow channels at high velocity to effect pickup of the sheet material even though no sealing is provided around the outer edge.

For a better understanding of the invention reference should be had to the following detailed description taken in conjunction with the drawings in which.

Figure 1:
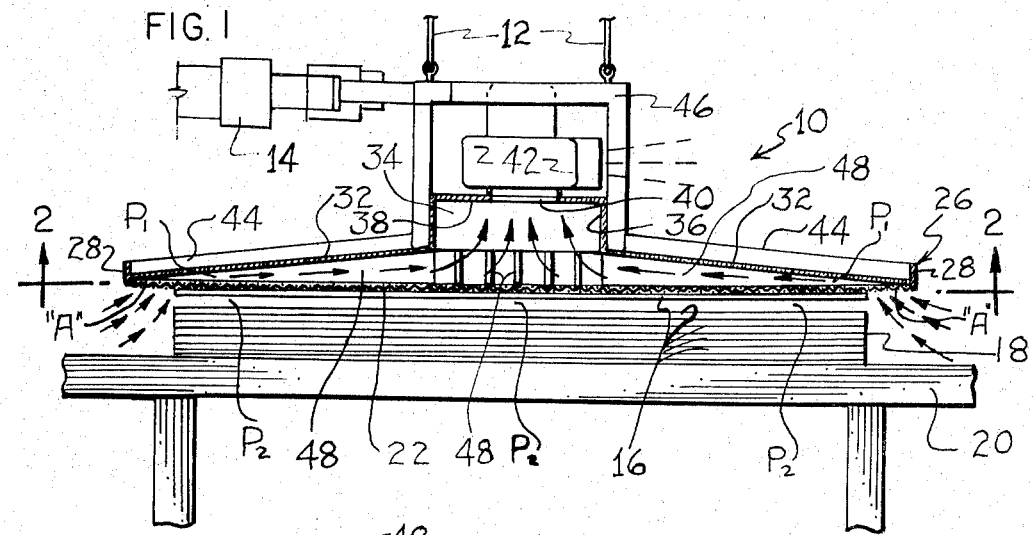
FIG. 1 is a vertical cross sectional view taken substantially along lines 1—1 of FIG. 2 showing an overhead air flow actuated pickup device for discrete pieces of limp sheet material constructed in accordance with the features of the present invention.
Figure 2:
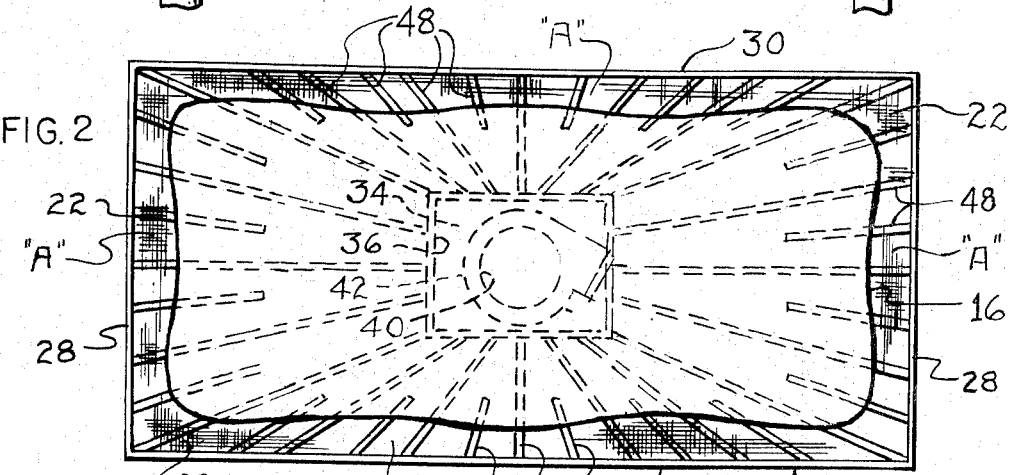
FIG. 2 is a horizontal sectional view looking upwardly in the direction of arrows 2—2 of FIG. 1.

Referring now more particularly to the drawings therein is illustrated a new and improved overhead pickup device for picking up and placement of discrete pieces or patterns of limp sheet material constructed in accordance with the present invention and referred to generally by the reference numeral 10. The pickup device 10 may be supported from suitable overhead support structure 12 or by a programmable manipulator arm 14 of the type shown in the aforementioned U.S. patent. The pickup device 10 is adapted to pick up and hold discrete pieces of limp sheet material 16 which may be in irregularly shaped patterns, and which pieces are arranged in a stack or pile 18 on a supporting work surface or table 20. As illustrated in FIG. 2 the pieces of limp sheet material 16 may have irregular edges or may be of standard geometric shapes as the pickup device 10 does not require tight sealing around the outer peripheral edge of the pieces as do vacuum operated suction cup type pickup devices.

In accordance with the present invention, the pickup device 10 includes a perforate support structure 22 which may comprise a screen of woven stranded material, a perforate plate having a plurality of perforations, and/or a foam pad having openings therein for permitting a high velocity air flow into the pickup device. While the surface of the screen 22 may be flat or generally planar as shown, the pickup surface can also be provided with a radius of curvature along one or more axes or may be spherical if needed for particular applications wherein the pieces of sheet material 16 are to be positioned on a curved surface or spherical object.

As viewed in FIG. 2, it is seen that the screen 22 is generally rectangular in shape to match the shape of the pieces of material 16 to be handled by the pickup device, and the screen is slightly larger in size in order to provide a marginal outer edge portion around the peripheral edge of the pieces 16. Although a rectangular shaped screen 22 has been shown in the drawings, it is to be understood that the screen may be of other shapes such as circular, oval, elliptical etc. and slightly larger than the shape or pattern geometry of the discrete pieces of limp sheet material to be handled by the pickup device.

The pickup device 10 includes a hood-like structure 24 above the screen 22 for containing and directing a high velocity air flow moving into the hood structure from beneath the screen around the peripheral marginal edge portion thereof spaced outwardly of the piece of sheet material 16. This outer edge portion around the piece of material is designated by the letter "A." The hood structure 24 includes an upstanding rectangular peripheral frame 26 having side frame members 28 and 30 and a top wall 32 sloped upwardly in a direction inwardly of the peripheral edge frame 26. The hood has a minimum height adjacent the outer edge and increases to a maximum height at its center adjacent a generally rectangular, box-like plenum chamber 34. The plenum chamber 34 includes an upstanding peripheral sidewall 36 and a top wall 38 having a circular opening 40 at the center in direct communication with the inlet of a centrifugal fan or blower 42.

The hood structure 24 is provided with suitable stiffening angles 44 or other structural members extending from the corners of the peripheral frame 26 inwardly to the corners of the plenum chamber 34 and a U-shaped support structure 46 of channel members is provided for supporting the pickup device 10 from the manipulator arm 14 or other suitable overhead support structures 12.

In accordance with the present invention, the hood structure 24 is provided with a plurality of flow dividers 48 between the top wall 32 and the upper surface of the screen 22. The flow dividers radiate outwardly of the plenum chamber and their outer ends join the sides 28 and 30 of the rectangular peripheral frame 26. The flow dividers are adapted to channel and direct the air flow at high velocity inwardly towards the plenum chamber 34. This air flow enters from beneath the hood around the outer edge portion "A" around the peripheral edge of the piece of limp sheet material 16. The spacing between the flow dividers is set up so that the flow is substantially evenly divided around the outer edge of the hood structure and the upper wall 32 of the hood structure is sloped at a shallow angle so that the cross-sectional flow area defined by each pair of adjacent flow dividers 48 above the screen 22 increases as the distance from the center of the plenum chamber 34 decreases. Accordingly, the highest velocity of air flow is achieved around the outer edges of the hood structure in the area "A" outwardly of the periphery of the piece sheet material 16. The velocity of air flow in each flow channel gradually decreases as the air moves inwardly toward the plenum chamber 34 and the plenum chamber is dimensioned to have a larger cross sectional flow area than the total of all of the flow channels at the inner ends. Accordingly, the flow velocity in the plenum chamber is substantially lower than the velocity in the outwardly radiating flow channels.

Dependent upon the degree of limpness or elasticity of the material pieces 16 and the weight thereof, the air flow volume entering the hood structure 24 around the outer edge portion "A" is adjusted to effect good pick up by adjusting the power input to the centrifugal fan 42. In accordance with Bernoulli's principle, the static pressure P1 (FIGS. 3 and 4) around the edge of the piece of material is reduced below the static pressure P2 beneath the material 16 because of the higher velocity of the flow above the material than below. The flow channels maintain this flow at a high velocity in comparison to the relatively low velocity below the piece of material and this difference in velocity creates the lift or pickup force for holding the piece of material against the screen 22. The pickup force is thus generated by differentials in velocity or flow and does require tight sealing around the edge of the material and a high vacuum as do suction cup type pickup devices.

Figure 4:
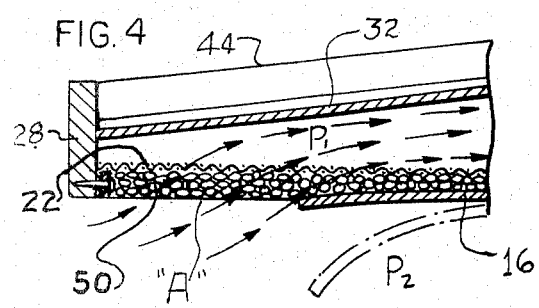
FIG. 4 is an enlarged vertical fragmentary cross sectional view similar to FIG. 3 but showing an alternate embodiment of an air-flow-operated pickup device in accordance with the present invention, using an open cell foam pad structure.
Figure 5:
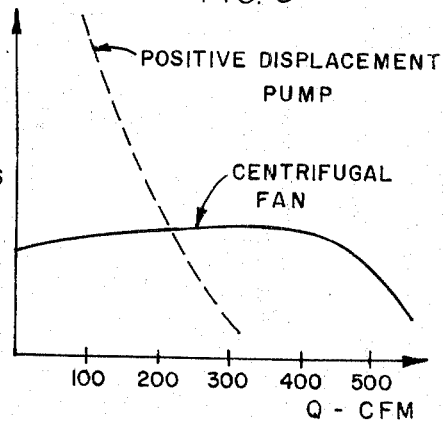
FIG. 5 is a schematic diagram indicating the pressure-volume characteristics of a positive displacement pump and a centrifugal fan.

The centrifugal fan 42 is of the type chosen with a characteristic generally as shown in FIG. 5 having a relatively constant pressure over a wide range of displacement volume. The fan is of the high volume, low pressure type and this is in sharp contrast with most vacuum pickup devices which utilize positive displacement vacuum pumps operated at high pressures and having a characteristic wherein the pressure drops off rapidly as the flow volume is increased. With the centrifugal fan 42 of the present invention, the volume is adjusted to provide a velocity of air flow entering into the hood structure 24 around the peripheral edges, which is high enough to pick up the piece of limp sheet material 16. The volume flow is adjusted so that the reduction in the static pressure in the high velocity flow above the screen is just enough to effect pickup of the material against the screen. Tight sealing is not required around the edges of the piece of material picked up as in the case of a vacuum cup type pickup device, because the slight pressure difference is induced by velocity change rather than suction pressure alone. Also, it is possible with the pickup device 10 to handle materials which themselves are porous and permit air flow therethrough. With the porous materials such as cloth and the like, the fan volume is adjusted to compensate for the leakage through the material itself and the velocity is slightly higher than with materials impervious to air flow. The flow dividers serve to channel the flow equally from the outer edge of the hood 24 inwardly toward the plenum chamber and a relatively high velocity is maintained all along the flow channels inwardly so that the piece of material 16 is lightly held against the lower surface of the support screen 22. The pickup of the pieces of sheet material 16 is effected by regulating velocity rather than pressure or vacuum and as shown in FIGS. 3 and 4, even though the material pieces 16 may tend to droop slightly around the peripheral edge, the high velocity flow limits the extent of the droop area and does not permit the piece to peel away under its own weight.

Referring now to FIG. 4, therein is illustrated another embodiment of the invention wherein a layer or pad 50 of open-celled foam material is provided beneath a screen 22 or other support structure to more evenly spread out and distribute the air flow entering the hood around the peripheral edge portion "A." The foam material is a nonrigid or resilient type to permit a slight amount of compression of the pad as indicated to achieve better pickup of heavier materials and materials such as tire tread rubbers and the like which are of uneven thickness. The foam pad 50 more uniformly distributes the flow of the air into the hood 24 over the marginal edge portion "A" and in applications where a large area hood is used for a relatively small size piece of material the excess area around the piece which is not utilized can be blocked off with an impervious sheet to reduce the volume of air flow required to effect the needed pickup velocity.

The flow channels are designed to direct the air flow inwardly from around the peripheral edge of material towards the centrally positioned plenum chamber and are dimensioned to increase in cross sectional flow area as the distance from the plenum chamber decreases. In this manner the flow velocity is gradually decreased toward the plenum chamber and is at a maximum value adjacent the outer edges of the sheet material being picked up wherein the air enters the hood structure from beneath the screen. In the plenum chamber 34 the velocity is greatly reduced because of the relatively large cross section and the air then is sucked into the high volume, low pressure fan 42. In tests conducted with a pickup device 10 in accordance with the present invention, a wide variety of limp sheet materials were successfully handled whereas vacuum cup type pickup devices were unable to pickup and support large size sheets of such materials and maintain the sheets in a flat condition without drooping. The device is useful for porous materials as well as impervious materials and can accommodate a variety of different weights of material as well as materials having a wide range in degree of elasticity. In addition the device is useful with materials having nonuniform thickness such as tire treads and the like.

Figure 3:
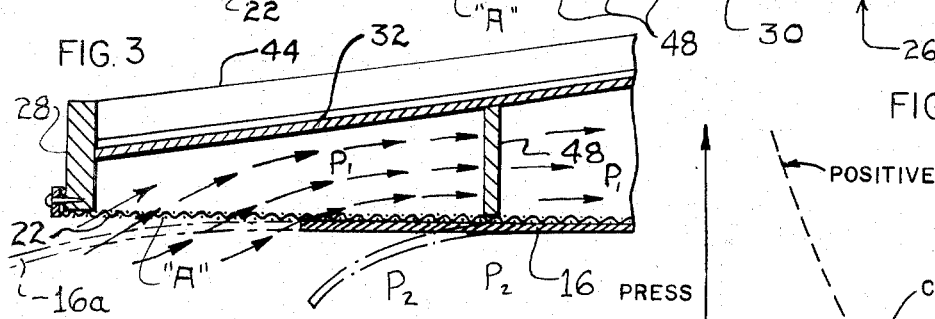
FIG. 3 is an enlarged fragmentary vertical cross sectional view taken substantially along lines 3—3 of FIG. 2.

Referring to FIG. 3, should the pieces of limp sheet material 16 being handled extend beyond the outer edge or periphery of the frame member 28, the material may droop away slightly as shown at 16a permitting air to flow into the hood structure at high velocity and effect the lift and holding forces previously described. This phenomenon generally occurs unless the material is so heavy that the weight of the portion extending beyond the edge causes the material to peel away at an acute or sharp angle from the screen.

As the present invention has been described by reference to several embodiments thereof, it will be apparent that numerous other modifications and embodiments will be devised by those skilled in the art which will fall within the true spirit and scope of the present invention.

What is claimed as new and desired to be secured by Letters Patent of the United States is:

1. An overhead pickup device suitable for picking up irregularly shaped pieces of limp, flexible sheet material comprising: means forming a perforate, planar support structure for engaging the upper surface of a piece of sheet material picked up by said device, said support structure having an area extending outwardly around the peripheral edge of said piece of sheet material in contact therewith, said structure having perforations defined therein distributed substantially uniformly over the entire surface area thereof, said perforations having a total area comprising a substantial portion of said entire surface area, flow chamber means above and in communication at its lower end with the entire area of said support structure joining and enclosing the periphery thereof, said flow chamber means having a cover wall spaced a minimum height above said support structure around said periphery and sloping upwardly to a maximum height above said structure adjacent the center of said area; plenum chamber means in communication with said flow chamber means adjacent the center of said area having a cross section flow area substantially greater than than the effective cross-sectional flow area of said flow chamber means between said periphery and said center; and fan means in suction communication with said plenum chamber means for moving air through said perforate support structure at high velocity flow rates at essentially constant low pressure.

2. The pickup device of claim 1 wherein said fan means comprises a centrifugal blower having an essentially relative constant pressure output over a wide range of flow rates.

3. The pickup device of claim 1 wherein said support structure comprises screen means of woven elongated strands.

4. The pickup device of claim 1 wherein support structure comprises a pad of open celled foam material.

5. The pickup device of claim 4 wherein said foam material is nonrigid.

6. The pickup device of claim 1 including a plurality of flow guiding vanes extending between said cover wall and said support structure in said flow chamber means for guiding air flow from said periphery toward said plenum chamber means with a gradual reduction in flow velocity.

7. The pickup device of claim 6 wherein said vanes are arranged on convergent paths toward said center forming flow channels of ever increasing cross-section area from said periphery toward said center.

8. The pickup device of claim 6 wherein said vanes are connected along their lower edges to said support structure and along their upper edges to said flow chamber means.

9. An overhead pickup device adapted for picking up irregularly shaped discrete pieces of limp sheet material comprising a perforated support member for contact with the upper surface of a piece of said sheet material to be picked up, said support member having a plurality of perforations therein distributed substantially uniformly over the entire surface thereof and dimensioned to define a marginal outer edge portion extending outwardly around the peripheral edge of said piece, said perforations having a total area comprising a substantial portion of said entire surface area; means defining a plurality of inwardly covergent flow channels extending inwardly from said outer edge portion toward a common plenum chamber centrally positioned above said support member, said channels having a progressively increasing flow cross-section inwardly of said outer edge portion to gradually reduce the velocity of flow between said outer edge portion and said plenum chamber; and fan means connected to said plenum chamber for drawing air inwardly through said channels from the outer ends adjacent said outer periphery of said piece of material, said fan means having a characteristic of an essentially constant pressure over a wide volume flow range.

10. The overhead pickup device of claim 9 wherein said means defining said flow channels comprises a hood structure having a peripheral edge member and a top wall sloping inwardly of said edge member upwardly to join said plenum chamber.

11. The overhead pickup device of claim 10 wherein said top wall is formed with an opening at the center thereof and said plenum chamber includes a peripheral sidewall joined along its lower edge to said top wall around said opening.

12. The overhead pickup device of claim 10 wherein said means defining said flow channels include a plurality of dividers between said top wall and said support member extending inwardly of said edge member toward said plenum chamber.

13. The overhead pickup device of claim 12 wherein said dividers are spaced apart to diverge away from each other outwardly of said plenum chamber.

14. The overhead pickup device of claim 10 wherein said plenum chamber includes a top wall having a central opening therein in communication with the inlet of said fan means.

15. The overhead pickup device of claim 14 wherein the cross sectional flow area of said plenum chamber is substantially greater than the maximum flow cross sections of said flow channels.

* * * * *

UNITED STATES PATENT OFFICE
CERTIFICATE OF CORRECTION

Patent No. 3,796,455   Dated  March 12, 1974

Inventor(s)  Torsten H. Lindbom

It is certified that error appears in the above-identified patent and that said Letters Patent are hereby corrected as shown below:

Title page, below "United States Patent" the name "Linkbom" should read --Lindbom--;

line 4, after "Inventor: Torsten H." the name "Linkbom" should read --Lindbom--;

Column 7, line 18, "covergent" should read --convergent--.

Signed and sealed this 23rd day of July 1974.

(SEAL)
Attest:

McCOY M. GIBSON, JR.
Attesting Officer

C. MARSHALL DANN
Commissioner of Patents